United States Patent
Doyle et al.

(10) Patent No.: US 7,565,545 B2
(45) Date of Patent: Jul. 21, 2009

(54) METHOD, SYSTEM AND PROGRAM PRODUCT FOR AUDITING ELECTRONIC TRANSACTIONS BASED ON BIOMETRIC READINGS

(75) Inventors: Roanld P. Doyle, Raleigh, NC (US); John R. Hind, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 743 days.

(21) Appl. No.: 10/369,303

(22) Filed: Feb. 19, 2003

(65) Prior Publication Data

US 2004/0162987 A1 Aug. 19, 2004

(51) Int. Cl.
*H04L 9/00* (2006.01)
*H04L 9/32* (2006.01)

(52) U.S. Cl. ............... 713/182; 713/186; 713/189; 380/46

(58) Field of Classification Search ............ 713/182, 713/186, 189; 380/46; 705/64; 382/100, 382/115–118, 124
See application file for complete search history.

(56) References Cited

U.S. PATENT DOCUMENTS

| 5,790,674 | A | 8/1998 | Houvener et al. |
| 5,799,083 | A | 8/1998 | Brothers et al. |
| 5,875,432 | A | 2/1999 | Sehr |
| 6,185,683 | B1 | 2/2001 | Ginter et al. |
| 6,263,438 | B1 | 7/2001 | Walker et al. |
| 6,282,649 | B1 | 8/2001 | Lambert et al. |

(Continued)

FOREIGN PATENT DOCUMENTS

| WO | WO 01/63567 A2 | 8/2001 |
| WO | WO 02/057701 A1 | 7/2002 |

OTHER PUBLICATIONS http://www.ecomaus.com/why select the technology.htm, "Why Select the Technology?", 2001, pp. 1-5.

(Continued)

*Primary Examiner*—Hosuk Song
(74) *Attorney, Agent, or Firm*—Hoffman Warnick LLC; Joseph E. Bracken

(57) ABSTRACT

Under the present invention a biometric reading, an audit point identity and transaction information are collected for each electronic transaction. Upon collection, the biometric reading, audit point identity and transaction information are packaged into an audit packet, which is then encrypted and stored in a log or the like. One or more of the electronic transactions can then be audited using this stored information. Specifically, for the electronic transactions that are to be audited, the corresponding audit packets are retrieved from storage and decrypted. Once decrypted, the biometric readings will be compared to each other to determine whether a set (e.g., one or more) of the electronic transactions is potentially fraudulent. Typically, a set of electronic transactions is potentially fraudulent if a plurality of the biometric readings are identical or too similar to each other.

36 Claims, 2 Drawing Sheets

U.S. PATENT DOCUMENTS

| | | | |
|---|---|---|---|
| 6,367,016 | B1 | 4/2002 | Lambert et al. |
| 6,802,005 | B1* | 10/2004 | Berson ............... 713/178 |
| 2002/0010679 | A1* | 1/2002 | Felsher ............... 705/51 |
| 2002/0016913 | A1* | 2/2002 | Wheeler et al. ......... 713/170 |
| 2002/0030359 | A1* | 3/2002 | Bergenek et al. ........ 283/68 |
| 2002/0161721 | A1 | 10/2002 | Yuan et al. |
| 2004/0024694 | A1* | 2/2004 | Lawrence et al. ........ 705/38 |
| 2004/0133582 | A1* | 7/2004 | Howard et al. ......... 707/100 |
| 2004/0158723 | A1* | 8/2004 | Root ................. 713/186 |
| 2004/0203594 | A1* | 10/2004 | Kotzin et al. .......... 455/411 |

OTHER PUBLICATIONS http://www.tara.ca/news/DPH082002.html., "Diaphonics Launches Spike Server Integrated Platform Uses Voice Biometrics to Prevent Fraud and Enhance Security in Business Transactions", Aug. 20, 2002, pp. 1-2.

http://www.nxlight.com/elements.jsp, "NxLight Elements", 2002, pp. 1-2.

http://www.trisys-europe.com/penop/what.htm, "PenOp", Date Unknown, pp. 1-3, 2002.

* cited by examiner

METHOD, SYSTEM AND PROGRAM PRODUCT FOR AUDITING ELECTRONIC TRANSACTIONS BASED ON BIOMETRIC READINGS

BACKGROUND OF THE INVENTION

1. Field of the Invention

The present invention generally relates to a method, system and program product for auditing electronic transactions based on biometric readings. Specifically, the present invention identifies potentially fraudulent activity based on a high degree of similarity between biometric readings that pertain to the electronic transactions.

2. Background Art

As the use of computer technology becomes more pervasive, the need for improved security is growing. Specifically, many of today's systems rely on user authentication as a primary form of access control. Typically, a user attempting to access a system will provide a user name and password that are checked against a list of authorized users. Unfortunately, this type of access control can be easy to circumvent by obtaining the user name and password of an authorized user. Moreover, password-based access control provides no way to definitively determine the identity of the accessing user. For example, if an electronic mail message is transmitted from the account of user "A," it could actually have been generated and transmitted by user "B." Unless there is video evidence that depicts user "B," it will be assumed that user "A" actually transmitted the message.

In an attempt to avoid such issues, the use of biometric readings (e.g., fingerprints, retina scans, signatures, etc.) has been implemented. Because biometric readings are unique to each individual, they not only provide better access control than a user name and password, but they also identify a particular individual. For example, when attempting to access a particular workstation, user "A" might have to provide his/her thumbprint. Once provided, the thumbprint will be used to identify and authenticate user "A" (e.g., Joe Smith). In general, a user is authenticated when his/her biometric reading is sufficiently similar to a previously provided "baseline" reading (e.g., taken upon commencement of employment). Although a best case scenario for authentication is to have an identical match between a biometric reading and a baseline biometric reading, most authentication systems allow for a certain degree of variation. This is to recognize that each biometric reading, although authentic, may not be completely identical. For example, if a user signs his/her name several times, each signature will likely vary from the others in certain, minimal ways due to, for example, the angle of the writing implement, the speed at which the signature is made, etc. Even fingerprints vary in appearance due to, for example, the type of reading device, the angle at which the finger is held, etc.

Unfortunately, because current authentication systems rely on biometric readings be similar or identical, they fail to account for counterfeited biometric readings. For example, assume that a counterfeiter copied user "A's" thumbprint and attempted to access user "A's" workstation multiple times using the copied thumbprint. Existing authentication systems would ignore the fact that all of the thumbprint readings were identical. Accordingly, each access attempt would likely be permitted simply because the thumbprints would be sufficiently similar to user "A's" baseline thumbprint. Thus, existing authentication systems ignore the fact that the biometric readings should in fact have some variation from each other.

In view of the foregoing, there exists a need for a method, system and program product for auditing electronic transactions based on biometric readings. Specifically, a need exists for biometric readings taken in conjunction with electronic transaction to be collected and stored in a secured fashion. A further need exists for the biometric readings to be compared to each other to identify potentially fraudulent activity.

SUMMARY OF THE INVENTION

In general, the present invention provides a method, system and program product for auditing electronic transactions based on biometric readings. Specifically, under the present invention a biometric reading, an audit point identity and transaction information are collected for each electronic transaction. Upon collection, the biometric reading, audit point identity and transaction information are packaged into an audit packet, which is then encrypted and stored in a log or the like. One or more electronic transactions can then be audited using this stored information. Specifically, for the electronic transactions that are to be audited, the corresponding audit packets are retrieved from storage and decrypted. Once decrypted, the biometric readings will be compared to each other to determine whether any of the electronic transactions are potentially fraudulent. Typically, a set of electronic transactions is potentially fraudulent if a plurality of the biometric readings are identical or "too" similar to each other. Thus, the present invention recognizes that multiple biometric readings, although collected from the same source (e.g., individual), should have certain distinctions.

According to a first aspect of the present invention, a method for auditing electronic transactions based on biometric readings is provided. The method comprises: (1) providing biometric readings pertaining to the electronic transactions; and (2) auditing the electronic transactions by comparing the biometric readings to each other to determine whether a set of the electronic transactions is potentially fraudulent.

According to a second aspect of the present invention, a method for auditing electronic transactions based on biometric readings is provided. The method comprises: (1) providing audit packets pertaining to the electronic transactions, wherein each of the audit packets includes a biometric reading, an audit point identity and transaction information; and (2) comparing the biometric readings in the audit packets to each other to determine whether a set of the electronic transactions is potentially fraudulent, wherein the set of electronic transactions is potentially fraudulent if a plurality of the biometric readings are similar beyond a predetermined tolerance.

According to a third aspect of the present invention, a system for auditing electronic transactions based on biometric readings is provided. The system comprises: (1) an access system for accessing audit packets, wherein each of the audit packets includes a biometric reading, an audit point identity and transaction information that pertain to the electronic transactions; and (2) a comparison system for comparing the biometric readings in the audit packets to each other to determine whether a set of the electronic transactions is potentially fraudulent.

According to a fourth aspect of the present invention, a system for auditing electronic transactions based on biometric readings is provided. The system comprises: (1) an input system for receiving biometric readings, audit point identities and transaction information pertaining to the electronic transactions; (2) a package system for packaging the biometric readings, the audit point identities and the transaction information into audit packets; (3) an encryption system for encrypting the audit packets; and (4) a storage system for storing the encrypted audit packets.

According to a fifth aspect of the present invention, a program product stored on a recordable medium for auditing electronics transactions based on biometric readings is provided. When executed, the program product comprises: (1) program code for accessing audit packets, wherein each of the audit packets includes a biometric reading, an audit point identity and transaction information that pertain to the electronic transactions; and (2) program code for comparing the biometric readings in the audit packets to each other to determine whether a set of the electronic transactions is potentially fraudulent.

According to a sixth aspect of the present invention, a program product stored on a recordable medium for auditing electronics transactions based on biometric readings is provided. When executed, the program product comprises: (1) program code for receiving biometric readings, audit point identities and transaction-information pertaining to the electronic transactions; (2) program code for packaging the biometric readings, the audit point identities and the transaction information into audit packets; (3) program code for encrypting the audit packets; and (4) program code for storing the encrypted audit packets.

Therefore, the present invention provides a method, system and program product for auditing electronic transactions based on biometric readings.

BRIEF DESCRIPTION OF THE DRAWINGS

These and other features of this invention will be more readily understood from the following detailed description of the various aspects of the invention taken in conjunction with the accompanying drawings in which.

Figure 1:
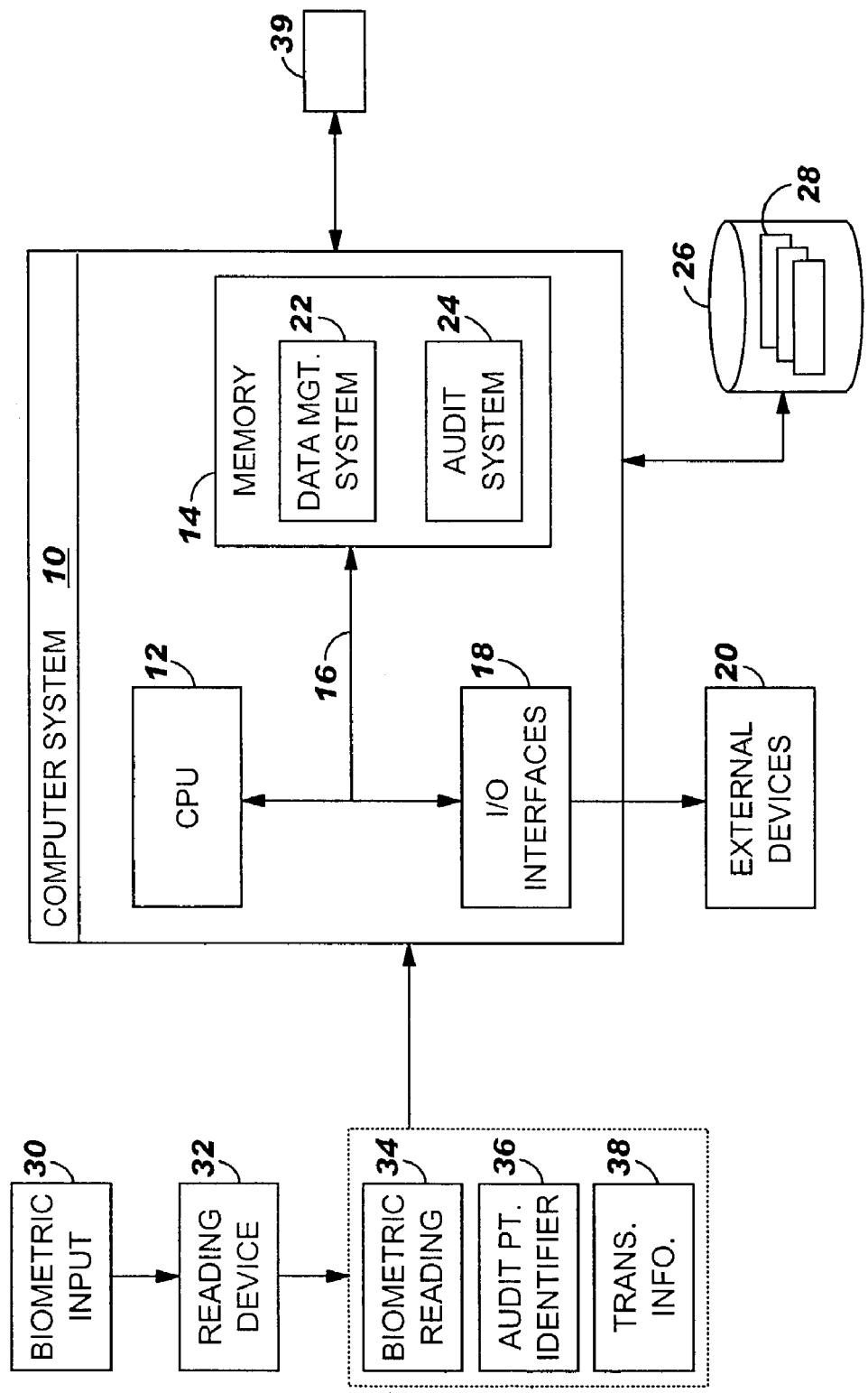
FIG. 1 depicts a system for auditing electronic transactions based on biometric readings according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, biometric readings have become increasingly popular in maintaining security. To date, biometric readings have been used in authentication of an individual (or a group of individuals) attempting to conduct an electronic transaction. For example, when a worker attempts to access a door in a building, the worker may have to present his/her thumbprint that will be used to determine whether the worker is authorized to access the door. Unfortunately, since biometric input can be counterfeited, the true identity of the worker cannot be definitively determined. For example, an intruder who has obtained a copy of the authorized worker's fingerprint would be given access to the door as if he/she was the authorized worker. Moreover, an electronic mail sent from user "A's" computer would be assumed to have been sent by user "A" him/herself To address these deficiencies in the art, the present invention provides a method, system and program product for auditing electronic transactions based on biometric readings. Specifically, under the present invention a biometric reading, an audit point identity and transaction information are collected for each electronic transaction. Upon collection, the biometric reading, audit point identity and transaction information are packaged into an audit packet, which is then encrypted and stored in a log or the like. One or more of the electronic transactions can then be audited using this stored information. Specifically, for the electronic transactions that are to be audited, the corresponding audit packets are retrieved from storage and decrypted. Once decrypted, the biometric readings will be compared to each other to determine whether a set (e.g., one or more) of the electronic transactions is potentially fraudulent. Typically, a set of electronic transactions is potentially fraudulent if a plurality of the biometric readings are identical or "too" similar to each other. Thus, the present invention recognizes that multiple biometric readings, although collected from the same source (e.g., individual), should have certain distinctions.

It should be understood in advance that the term electronic transaction as used herein is intended to incorporate any type of activity that utilizes electronic technology. For example, an electronic transaction could be a request to access a particular computer system and/or software program, a request to access a door in a building, an attempt to verify a bank check, a transmission of an electronic mail message or cellular telephone short message, a telephone call, etc.

Referring now to FIG. 1, a system for auditing electronic transactions based on biometric readings is shown. As depicted, computer system 10 communicates with reading device 32, which receives biometric input 30. Under the present invention biometric input 30 can be anything from which reading device 32 can obtain and output a biometric reading 34 along with an audit point identity 36 and transaction information 38. For example, biometric input can be a check having a signature, a finger, an eye, etc. To this extent, reading device 32 can be any type of device capable of receiving biometric input 30 and outputting a biometric reading 34. For example, reading device 32 can be a fingerprint reader, a retina scanner, a check scanner, a set of biometric sensors (e.g., arranged on the keypad of a telephone), etc. In any event, the auditing of electronic transactions under the present invention is intended to accommodate any type of biometric reading such as, for example, a fingerprint, a signature, a retina scan, a biological sample (e.g., hair or blood), etc.

As depicted, computer system 10 includes central processing unit (CPU) 12, memory 14, bus 16, input/output (I/O) interfaces 18 and external devices/resources 20. CPU 12 may comprise a single processing unit, or be distributed across one or more processing units in one or more locations, e.g., on a client and server. Memory 14 may comprise any known type of data storage and/or transmission media, including magnetic media, optical media, random access memory (RAM), read-only memory (ROM), a data cache, a data object, etc. Moreover, similar to CPU 12, memory 14 may reside at a single physical location, comprising one or more types of data storage, or be distributed across a plurality of physical systems in various forms.

I/O interfaces 18 may comprise any system for exchanging information to/from an external source. External devices/resources 20 may comprise any known type of external device, including speakers, a CRT, LED screen, hand-held device, keyboard, mouse, voice recognition system, speech output system, printer, monitor/display, facsimile, pager, etc. Bus 16 provides a communication link between each of the components in computer system 10 and likewise may comprise any known type of transmission link, including electrical, optical, wireless, etc. In addition, although not shown, additional components, such as cache memory, communication systems, system software, etc., may be incorporated into computer system 10.

Shown in memory 14 is data management program/system 22 and audit program/system 24. It should be understood that data management system 22 and audit system 24 could be loaded on separate computer systems. These systems are shown both loaded on computer system 10 for illustrative purposes only. As indicated above, an individual or group of individuals conducting an electronic transaction will provide biometric input 30, which will be read by reading device 32. For example, assume that biometric input 30 is a bank check written pursuant to a purchase of goods. Reading device 32 will "scan" the check and output an image of the check. Existing authentication systems would utilize the image to authorize check. For example, an authentication system (not shown) would compare the signature on the check image to the stored signature of the account holder (e.g., as given when the account was opened). If the signatures were sufficiently similar, the check would be approved. Under the present invention, the image of the check will be further used to perform an audit. Specifically, reading device 32 will output biometric reading 34, audit point identity 36 and transaction information 38.

In this example, biometric reading 34 and transaction information 38 are contained within the check image. Specifically, biometric reading 34 is the signature on the check image. Transaction information 38 are the details of the transaction being attempted (e.g., the other information on the check image). For example, transaction information 38 would be to whom the check was made payable, for what amount, on what date, on what account the check was drawn, etc. Audit point identity 36 is the precise identity and/or location of reading device 32. Thus, audit point identity 36 could be "check scanner X in merchant Z." Audit point identity is useful because it could help pinpoint a faulty reading device 32 (e.g., check scanner X), a particular point of intrusion (e.g., merchant Z), etc.

In any event, upon receipt by computer system 10, data management system 22 will package biometric reading 34, audit point identity 36 and transaction information 38 into an audit packet, encrypt part or all of the audit packet, and then store the audit packet 28 in storage unit 26 for future audits. Under the present invention, storage unit 26 can be any system capable of providing storage for audit packets 28 (e.g., a log, a database, etc.). As such, storage unit 26 could include one or more storage devices, such as a magnetic disk drive or an optical disk drive. In another embodiment, storage unit 26 includes data distributed across, for example, a local area network (LAN), wide area network (WAN) or a storage area network (SAN) (not shown). Storage unit 26 may also be configured in such a way that one of ordinary skill in the art may interpret it to include one or more storage devices.

It should be understood that communication with computer system 10 (e.g., from reading device 32) can occur via a direct hardwired connection (e.g., serial port), or via an addressable connection in a client-server (or server-server) environment which may utilize any combination of wireline and/or wireless transmission methods. In the case of the latter, the server and client may be connected via the Internet, a wide area network (WAN), a local area network (LAN), a virtual private network (VPN) or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Figure 2A:
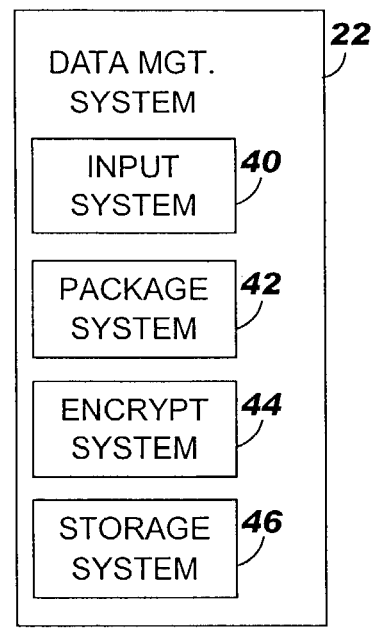
FIG. 2A depicts the data management system of FIG. 1.

Referring now to FIGS. 1 and 2A collectively, the functions of data management system 22 will be described in greater detail. As depicted in FIG. 2A, data management system 22 includes input system 40, package system 42, encryption system 44 and storage system 46. In general, biometric reading 34, audit point identity 36 and transaction data 38 will be received by input system 40. It should be appreciated that biometric reading 34, audit point identity 36 and transaction data 38 are shown in FIG. 1 as all being outputted from reading device 32 for illustrative purposes only. To this extent, it should be understood that biometric reading 34, audit point identity 36 and transaction data 38 could actually be received by input system 40 from more than one source or reading device. In any event, upon receipt, package system 42 will package biometric reading 34, audit point identity 36 and transaction data 38 into separate "blocks" of an audit packet. For example, in packaging the check image, package system 42 could store the signature in block "A," while storing audit point identity 36 and transaction information 38 in blocks "B" and C," respectively. In separately storing of the data in this manner, portions of the check image would be "lifted" and possibly analyzed by recognition software. This functionality could be performed within reading device 32 and/or package system 34.

In any event, once formed, part or all of the audit packet will be encrypted by encryption system 44. Encryption of the audit packet is important because the data must be secured while stored and awaiting audit. If a hacker were able to access stored audit packets and duplicate the biometric readings, a tremendous security risk would be posed. In encrypting the audit packet, encryption system 44 could simply encrypt block "A" containing the biometric reading. Alternatively, one or both of blocks "B" and "C" could be encrypted as well. In a typical embodiment, the audit packet is encrypted symmetrically with a random number, which itself is then encrypted with a public key. Once the audit packet is encrypted, it will be stored by storage system 46 in storage unit 26.

A series of electronic transactions could be processed in this manner, and each could have a corresponding audit packet 28 that is encrypted and stored in storage unit 26. It should be understood that all audit packets need not be encrypted with the same random number and/or public key. To this extent, the precise method of encryption is not intended to be limiting. In any event, the stored audit packets 28 will be used by audit system 24 and/or auditor 39 (FIG. 1) to determine whether any fraudulent activity had occurred.

Figure 2B:
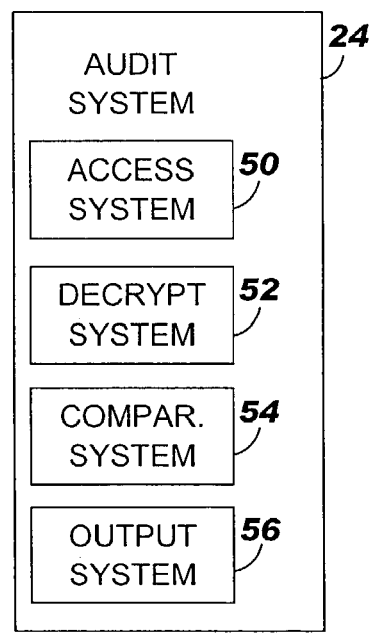
FIG. 2B depicts the audit system of FIG. 1.

Referring now to FIGS. 1 and 2B collectively, the functions of audit system 24 will be described in greater detail. As depicted in FIG. 2B, audit system 24 includes access system 50, decryption system 52, comparison system 54 and output system 56. In general, an audit will be performed under the present invention by examining multiple audit packets and the extent to which their biometric readings are identical. For example, assume that there are ten audit packets 24 in storage unit 26 that correspond to ten bank checks drawn on the checking account of "Joe Smith" for the month of March. Based on internal programming and/or upon instructions from auditor 39, access system 50 can access/retrieve those audit packets 28 from storage unit 26. Once retrieved decryption system 52 will decrypt the audit packets 28. In a typical embodiment, decryption system 52 will use a private key(s) in conjunction with the public key(s) to decrypt the random number for each audit packet. The random number(s) will be used to decrypt the audit packets 28.

Upon decryption, comparison system 54 will compare the biometric readings (e.g., signatures) therein to each other. This is unlike authentication where the biometric readings were compared to the "baseline" biometric reading (e.g., a signature given when the account was opened). In general, a set (e.g., one or more) of the electronic transactions was potentially fraudulent if a plurality of the biometric readings were identical or "too" similar to each other. For example, if the signatures on the last five checks cashed on "Joe Smith's" account were exactly identical, it is likely that some or all of the signatures were counterfeited (e.g., copied from a valid check). As indicated above, each time a person signs his/her name, certain minimal differences will be present. These differences are caused by factors such as the angle of the writing implement used, the speed of the signature, etc. Accordingly, it is highly unlikely that numerous signatures will ever be exactly identical to each other. Although this might occur once, multiple occurrences are a strong indication that fraud had occurred. To this extent, comparison system 54 could be programmed to "flag" biometric readings (and optionally their associated electronic transactions) that are identical or "too" similar to each other. In a typical embodiment, comparison system 54 is programmed to apply a predetermined "similarity" tolerance to the comparison of biometric readings. If the predetermined tolerance is exceeded (i.e., if the biometric readings are similar beyond the predetermined tolerance), the biometric readings are too similar (or possibly identical), and fraudulent activity has potentially occurred. For example, comparison system 54 could "flag" biometric readings that have less than a certain number of distinctions from each other (e.g., less than two distinct letters in a signature could indicate fraud). Still yet, the predetermined tolerance could be based on a percent match of the biometric readings. For example, comparison system 54 could include program code that determines what percent match two biometric readings are to each other (e.g., similar to existing DNA or fingerprint matching technology). If the percent match is beyond the predetermined tolerance (e.g., the signatures are more than a 90% match to each other), the biometric readings could be "flagged." It should be appreciated that in judging whether electronic transactions are potentially fraudulent in this manner, the predetermined tolerance could be effectively set to "zero." In this case, electronic transactions would be "flagged" only if their biometric readings were identical (e.g., the signatures are a 100% match to each other).

In any event, once the comparison is complete, output system 56 will output the comparison results (e.g., to auditor 39). Such results can denote the biometric readings that were identical as well as any other necessary information. Specifically, because the biometric readings were stored with audit point identities and transaction information, the transaction details as well as the readings devices used will be readily identifiable. Thus, in this example, the present invention would allow "Joe Smith's" account to be flagged, and the fraud to be stopped.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls computer system 10 such it carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the processing of a bank check was described herein for illustrative purposes only. Other types of biometric readings (e.g., fingerprints, retina scans, etc.) could be processed and used to perform audits under the present invention in a similar manner. In many of these other cases, however, transaction information 38 might not be gleaned from biometric input 30 as it was from the bank check. For example, if biometric input 30 is a finger presented for scanning, transaction information (e.g., an attempt to access door A in building Z) could be generated by and transmitted from reading device 32 along with audit point identity 36.

We claim:

1. A method for auditing electronic transactions based on biometric readings, comprising:
  providing a plurality of biometric readings pertaining to the electronic transactions; wherein each biometric reading has been authenticated against a baseline biometric reading;
  auditing the electronic transactions by comparing the biometric readings to each other to determine whether a set of the electronic transactions should be rejected because the set of electronic transactions corresponds to a counterfeit duplication of a biometric reading, wherein the electronic transactions are selected from a group consisting of a physical access request, a check request, and electronic message, and a telephone call; wherein the set of electronic transactions corresponds to a counterfeit duplication of a biometric reading in the case that a plurality of the biometric readings are similar beyond a predetermined tolerance; and
  providing results of the audit; wherein the results include the determination of whether the set of electronic transactions should be rejected because the set of electronic transactions corresponds to a counterfeit duplication of a biometric reading.

2. The method of claim 1, wherein the set of electronic transactions also corresponds to a counterfeit duplication of a biometric reading in the case that a plurality of the biometric readings are identical.

3. The method of claim 1, further comprising:
  packaging each of the biometric readings with an audit point identity and transaction information in audit packets;

encrypting the audit packets; and storing the encrypted audit packets, prior to the auditing step.

4. The method of claim 3, wherein the encrypting step comprises:

symmetrically encrypting the audit packets with a random number; and encrypting the random number with a public key.

5. The method of claim 4, further comprising decrypting the audit packets, prior to the auditing step.

6. The method of claim 5, wherein the decrypting step comprises:

decrypting the random number with the public key and a private key; and decrypting the audit packets with the random number.

7. The method of claim 1, wherein the biometric readings are selected from a group consisting of a retina scan, a fingerprint, a biological sample and a signature.

8. The method of claim 1, wherein the electronic transactions further include a computerized system access request.

9. A method for auditing electronic transactions based on biometric readings, comprising:

providing encrypted audit packets pertaining to the electronic transactions, wherein each of the audit packets includes a biometric reading, an audit point identity and transaction information; wherein each biometric reading has been authenticated against a baseline biometric reading;

comparing the biometric readings in the audit packets to each other to determine whether a set of the electronic transactions should be rejected because the set of electronic transactions corresponds to a counterfeit duplication of a biometric reading; wherein the electronic transactions are selected from a group consisting of a physical access request, a check request, and electronic message, and a telephone call; wherein the set of electronic transactions corresponds to a counterfeit duplication of a biometric reading in the case that a plurality of the biometric readings are similar beyond a predetermined tolerance; and providing results of the audit; wherein the results include the determination of whether the set of electronic transactions should be rejected because the set of electronic transactions corresponds to a counterfeit duplication of a biometric reading.

10. The method of claim 9, wherein the providing step comprises encrypting the audit packets.

11. The method of claim 10, wherein the encrypting step comprises:

symmetrically encrypting each of the audit packets with a random number; and encrypting the random number with a public key.

12. The method of claim 11, further comprising decrypting the encrypted audit packet, wherein the decrypting step comprises:

decrypting the random number with the public key and a private key; and decrypting each of the audit packets with the random number.

13. The method of claim 9, wherein the biometric readings are selected from a group consisting of a retina scan, a fingerprint, a biological sample and a signature.

14. The method of claim 9, wherein the electronic transactions further include a computerized system access request.

15. The method of claim 9, wherein the predetermined tolerance is zero.

16. A system for auditing electronics transactions based on biometric readings, comprising:

an access system for accessing audit packets, wherein each of the audit packets includes a biometric reading, an audit point identity and transaction information that pertain to the electronic transactions; wherein each biometric reading has been authenticated against a baseline biometric reading;

a comparison system for comparing the biometric readings in the audit packets to each other to determine whether a set of the electronic transactions should be rejected because the set of electronic transactions corresponds to a counterfeit duplication of a biometric reading; wherein the electronic transactions are selected from a group consisting of a physical access request, a check request, and electronic message, and a telephone call; wherein the set of electronic transactions corresponds to a counterfeit duplication of a biometric reading in the case that a plurality of the biometric readings are similar beyond a predetermined tolerance; and an output system for providing results of the audit; wherein the results include the determination of whether the set of electronic transactions should be rejected because the set of electronic transactions corresponds to a counterfeit duplication of a biometric reading.

17. The system of claim 16, wherein the set of electronic transactions also corresponds to a counterfeit duplication of a biometric reading in the case that a plurality of the biometric readings are identical.

18. The system of claim 16, wherein the audit packets are encrypted when accessed by the access system, and wherein the system further comprises a decryption system for decrypting the encrypted audit packets.

19. The system of claim 16, further comprising:

an input system for receiving a biometric reading, audit point identity and transaction information;

a package system for packaging the biometric reading, the audit point identity and the transaction information into an audit packet;

an encryption system for encrypting the audit packet; and a storage system for storing the encrypted audit packet for access by the access system.

20. The system of claim 16, wherein the biometric readings are selected from a group consisting of a retina scan, a fingerprint, a biological sample and a signature.

21. The method of claim 16, wherein the electronic transactions further include a computerized system access request.

22. A system for auditing electronic transactions based on biometric readings, comprising:

an input system for receiving biometric readings, audit point identities and transaction information pertaining to the electronic transactions; wherein each biometric reading has been authenticated against a baseline biometric reading;

a package system for packaging the biometric readings, the audit point identities and the transaction information into audit packets;

an encryption system for encrypting the audit packets;

a storage system for storing the encrypted audit packets;

a comparison system for comparing the biometric readings in the audit packets to each other to determine whether a set of the electronic transactions should be rejected because the set of electronic transactions corresponds to a counterfeit duplication of a biometric reading; wherein the electronic transactions are selected from a group consisting of a physical access request, a check request, and electronic message, and a telephone call; wherein the set of electronic transactions corresponds to a counterfeit duplication of a biometric reading in the case that a plurality of the biometric readings are similar beyond a predetermined tolerance; and an output system for providing results of the audit; wherein the results include the determination of whether the set of electronic transactions should be rejected because the set of electronic transactions corresponds to a counterfeit duplication of a biometric reading.

23. The system of claim 22, further comprising
an access system for accessing the stored audit packets; and
a decryption system for decrypting the audit packets.

24. The system of claim 22, wherein the set of electronic transactions also corresponds to a counterfeit duplication of a biometric reading in the case that a plurality of the biometric readings are identical.

25. The system of claim 22, wherein the biometric readings are selected from a group consisting of a retina scan, a fingerprint, a biological sample and a signature.

26. The method of claim 22, wherein the electronic transactions further include a computerized system access request.

27. A program product stored on a recordable medium for auditing electronics transactions based on biometric readings, which when executed comprises:
program code for accessing audit packets, wherein each of the audit packets includes a biometric reading, an audit point identity and transaction information that pertain to the electronic transactions; wherein each biometric reading has been authenticated against a baseline biometric reading;
program code for comparing the biometric readings in the audit packets to each other to determine whether a set of the electronic transactions should be rejected because the set of electronic transactions corresponds to a counterfeit duplication of a biometric reading; wherein the electronic transactions are selected from a group consisting of a physical access request, a check request, and electronic message, and a telephone call; wherein the set of electronic transactions corresponds to a counterfeit duplication of a biometric reading in the case that a plurality of the biometric readings are similar beyond a predetermined tolerance; and
program code for providing results of the audit; wherein the results include the determination of whether the set of electronic transactions should be rejected because the set of electronic transactions corresponds to a counterfeit duplication of a biometric reading.

28. The program product of claim 27, wherein the set of electronic transactions corresponds to a counterfeit duplication of a biometric reading in the case that a plurality of the biometric readings are identical.

29. The program product of claim 27, wherein the audit packets are encrypted when accessed by the program code for accessing, and wherein the system further comprises program code for decrypting the encrypted audit packets.

30. The program product of claim 27, further comprising:
program code for receiving a biometric reading, audit point identity and transaction information;
program code for packaging the biometric reading, the audit point identity and the transaction information into an audit packet;
program code for encrypting the audit packet; and
program code for storing the encrypted audit packet for access by the access system.

31. The program product of claim 27, wherein the biometric readings are selected from a group consisting of a retina scan, a fingerprint, a biological sample and a signature.

32. The program product of claim 27, wherein the electronic transactions further include a computerized system access request.

33. A program product stored on a recordable medium for auditing electronics transactions based on biometric readings, which when executed comprises:
program code for receiving biometric readings, audit point identities and transaction information pertaining to the electronic transactions; wherein each biometric reading has been authenticated against a baseline biometric reading;
program code for packaging the biometric readings, the audit point identities and the transaction information into audit packets;
program code for encrypting the audit packets;
program code for storing the encrypted audit packets;
program code for comparing the biometric readings in the audit packets to each other to determine whether a set of the electronic transactions should be rejected because the set of electronic transactions corresponds to a counterfeit duplication of a biometric reading; wherein the electronic transactions are selected from a group consisting of a physical access request, a check request, and electronic message, and a telephone call; wherein the set of electronic transactions corresponds to a counterfeit duplication of a biometric reading in the case that a plurality of the biometric readings are similar beyond a predetermined tolerance; and
program code for providing results of the audit; wherein the results include the determination of whether the set of electronic transactions should be rejected because the set of electronic transactions corresponds to a counterfeit duplication of a biometric reading.

34. The program product of claim 33, further comprising program code for accessing the stored audit packets; and program code for decrypting the audit packets.

35. The program product of claim 33, wherein the set of electronic transactions corresponds to a counterfeit duplication of a biometric reading in the case that a plurality of the biometric readings are identical.

36. The program product of claim 33, wherein the electronic transactions further include a computerized system access request.

* * * * *